United States Patent [19]

Robertson, IV

[11] Patent Number: 4,877,426

[45] Date of Patent: Oct. 31, 1989

[54] METHOD AND APPARATUS FOR UNLOADING VAPOR ADSORBERS

[75] Inventor: Harry W. Robertson, IV, Covington, Va.

[73] Assignee: Westvaco Corporation, New York, N.Y.

[21] Appl. No.: 270,815

[22] Filed: Nov. 14, 1988

[51] Int. Cl.$^4$ ............................................. B01D 53/02
[52] U.S. Cl. ......................................... 55/74; 55/98; 55/181; 55/387; 55/390; 55/479; 55/467
[58] Field of Search .................... 55/96, 387, 74, 467, 55/98, 181, 390, 479

[56] References Cited

U.S. PATENT DOCUMENTS 3,606,998 9/1971 LaPorte et al. .......................... 21/74
4,336,159 6/1982 Winter .................................. 252/411
4,536,197 8/1985 Cook ....................................... 55/28

Primary Examiner—Bernard Nozick
Attorney, Agent, or Firm—W. A. Marcontell; R. L. Schmalz

[57] ABSTRACT

The draft forcing fan system in a vapor adsorber is used to extract spent powdered or granular adsorbent from the contacting column by blocking the normal air route intake and discharge ducts. Auxiliary fittings mounted on the intake and discharge ducting facilitate temporary duct connections with a conveniently sized vacuum receiving cannister. In this mode, the fan which forces draft through the adsorption unit operates as a vacuum sweeper. A manually manipulated sweeper wand connected to the vacuum cannister is used to draft the spent adsorbent charge from the contacting chamber into the cannister for removal, regeneration or disposal.

6 Claims, 5 Drawing Sheets

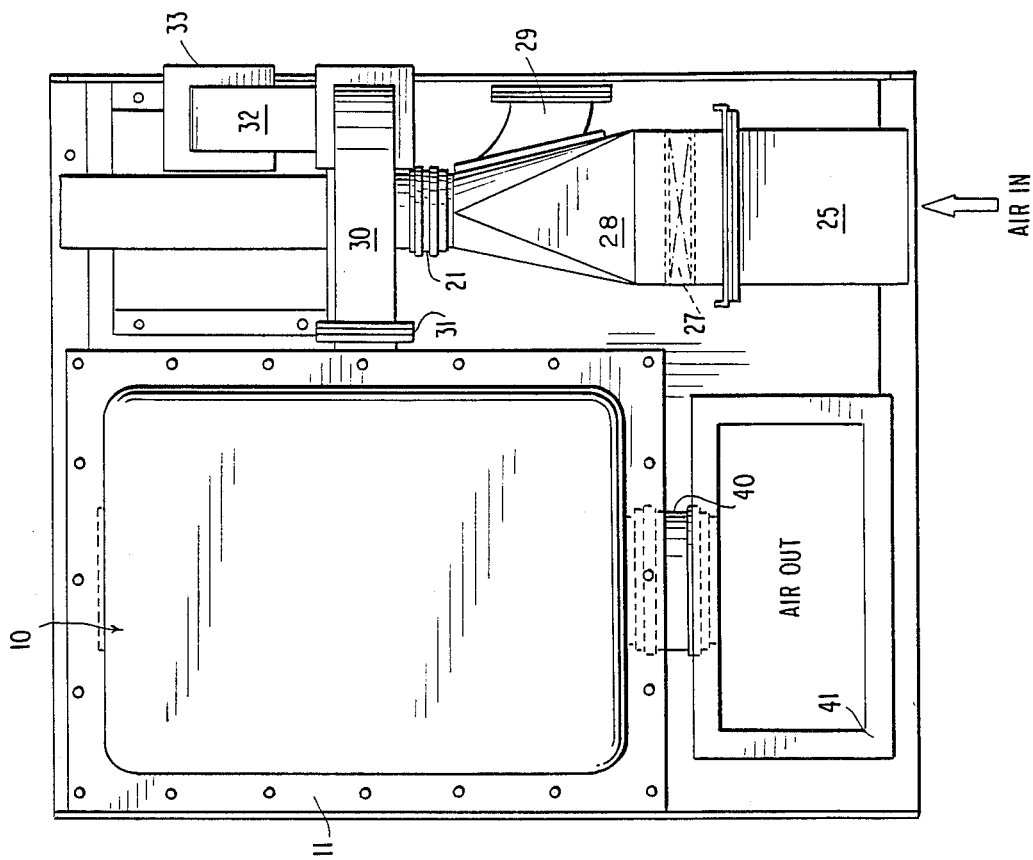
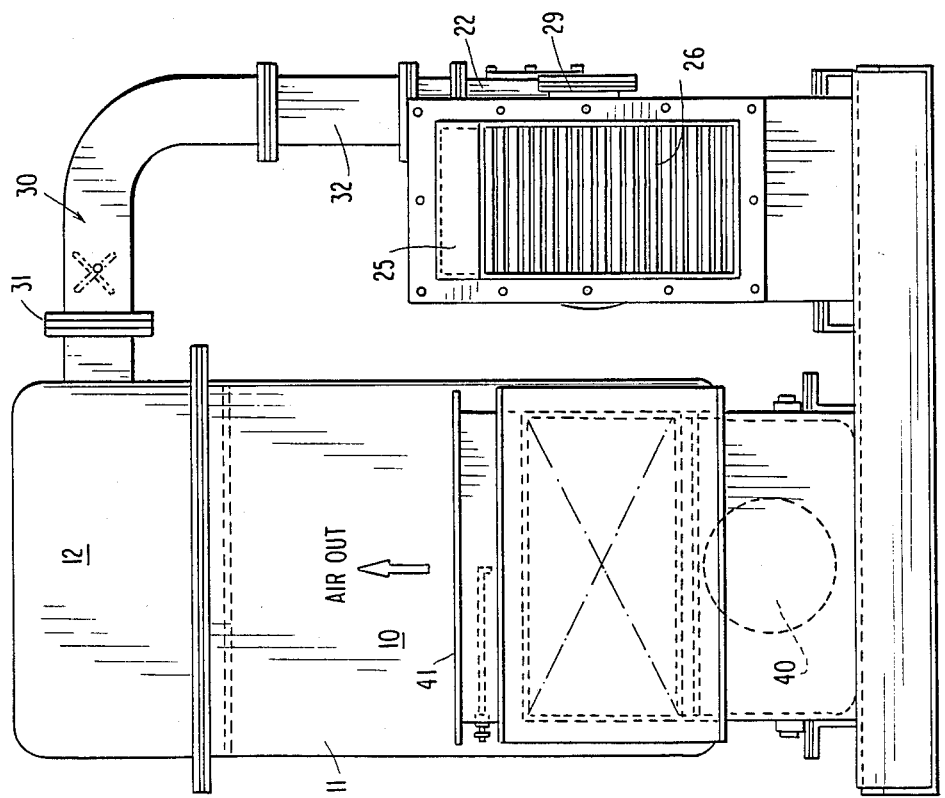

METHOD AND APPARATUS FOR UNLOADING VAPOR ADSORBERS

BACKGROUND OF THE INVENTION

1. Field of the Invention

The present invention relates to air and vapor purification devices which function on the principle of adsorbency. In particular, this invention addresses the maintenance of such devices which require periodic regeneration or replacement of the adsorbent medium.

2. Description of the Prior Art

One of the more successful devices for cleansing air or vapor streams of undesirable chemical compounds is by means of a vapor adsorber. The objective of a vapor adsorber is to pass the air entering a closed volume through an adsorption column of particulate, activated carbon. Due to an adsorptive affinity for the carbon, certain compounds carried in the vapor phase by the air are held within the adsorption column.

This adsorption process is viewed as consumptive. As the process continues, the activated carbon charge attritionally saturates and loses its adsorptive capacity: a state known in the art as "spent." Although there are some vapor adsorber designs adapted for in situ regeneration of the carbon charge, most units require physical removal of the spent charge and replacement with freshly activated adsorbent. Such removal of the spent charge represents a difficult material handling problem.

A vapor adsorber charge mass may weigh from a few hundred pounds to several thousand. Charge consistency may be granular, pelletized or powdered. The generally practiced method of spent charge removal has been by vacuum truck whereby the charge is drafted from the adsorption vessel into a truck mounted container. When compatible with the adsorption unit operating site, the vacuum truck method is clean and effective. However, it is not always possible to locate a vapor adsorber unit on a truck accessible site. Moreover, a vacuum truck is an expensive, highly specialized vehicle maintained by relatively few vapor adsorber users. When needed, the equipment must be contracted from a third party and utility scheduled accordingly. If the vapor adsorber is used to protect an extremely sensitive environment, such equipment scheduling may become critical.

It is, therefore, an objective of the present invention to teach a clean and efficient method of removing a spent carbon charge from a vapor adsorber contact vessel using a minimum of light and inexpensive accessory equipment.

Another object of the present invention is to conveniently adapt a vapor adsorber unit as a vacuum sweeper for extraction of spent adsorbent charge from the unit contacting vessel.

SUMMARY OF THE INVENTION

These and other objects of the invention, as will subsequently become apparent, are accomplished by a few modifications of the air duct work typical in vapor adsorber units. Such modifications include a panel to block the induced air draft into the unit fan intake duct. An auxiliary mounting receptacle on the intake duct is provided to secure an appropriately sized vacuum hose. On the high velocity, fan discharge side, the discharge flow path is directed into a simple bag filter.

To complete the conversion of a vapor adsorber draft forcing fan to a vacuum sweeper power unit, a cannister of convenient size is provided to receive spent adsorbent drafted from the contact vessel. This cannister is closed by a cover which incorporates reception fittings for the vacuum hose from the intake duct and a manually manipulated sweeper wand.

In this modified mode, the contact vessel cover is removed to expose the spent adsorbent. So exposed, the fan is started to induce draft through the sweeper system. Manual manipulation of the sweeper wand within the spent adsorbent charge bed draws the adsorbent into the cannister.

Multiple cannisters may be required to remove a single adsorbent bed but each cannister is of sufficiently small size and weight as to be manually manageable.

DESCRIPTION OF THE DRAWINGS

Relative to drawings wherein like reference characters designate like o similar elements throughout the several FIGS. of the drawings:

FIG. 2 is an end elevation of a vapor adsorber unit in operating assembly.

FIG. 3 is a plan view of a vapor adsorber unit in operating assembly.

DESCRIPTION OF THE PREFERRED EMBODIMENT

Figure 1:
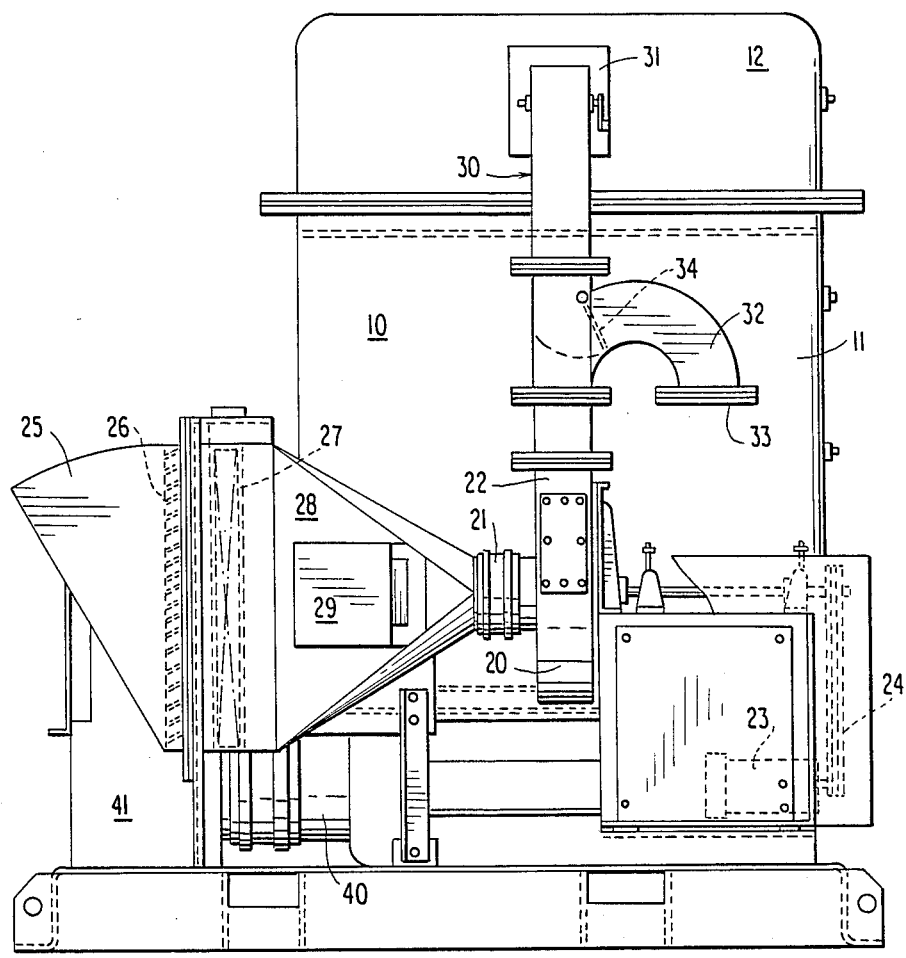
FIG. 1 is a side elevation of a vapor adsorber unit in operating assembly.

Except for the modifications to be described herein, FIGS. 1, 2 and 3 represents a typical skid-mounted vapor adsorber for cleaning atmospheric air of undesirable chemical vapors such as acids and hydrocarbons. The dominant physical component of this assembly is the contacting vessel 10 which comprises a lower body 11 and a removable top cover 12. Suitable adsorbent such as granular or powdered activated carbon fills the lower body 11 above a perforated bed support.

Operationally supporting the contact vessel 10 is an air fan 20 having inlet and discharge connections 21 and 22, respectively. The fan is driven by a motor 23 and belt transmission 24.

Fan inlet ducting comprises a hood 25, directional louvers 26 and a mat filter 27. A transition element 28 funnels air from the filter 27 into the fan inlet 21. For the present invention, a duct connection piece 29 is attached to the side of the transition element 28. During normal operation, this connection piece 29 is closed by a cover flange.

High velocity ducting 30 connects the fan discharge 22 to the contacting vessel top cover 12 at a flange joint 31. The present invention provides a return $-Y$ connection 32 in the duct riser. During normal vapor adsorber operation, the return element of the connection is covered by a blind flange 33. Preferably, the return $-Y$ connection 32 also includes a movable flow directing plate 34 to reduce air turbulence past the flow channel intersection.

From the bottom of the contact vessel lower body 12 is provided a low velocity air discharge connection 40 to channel purified air into distribution ducting 41.

As practiced by the prior art, a spent adsorption medium charge would be removed by removing the contacting vessel top cover 12 which exposes the adsorption bed. A pickup wand from a vacuum truck would be manually manipulated to draft the particulate adsorbent from the bed top into the truck chamber.

Figure 4:
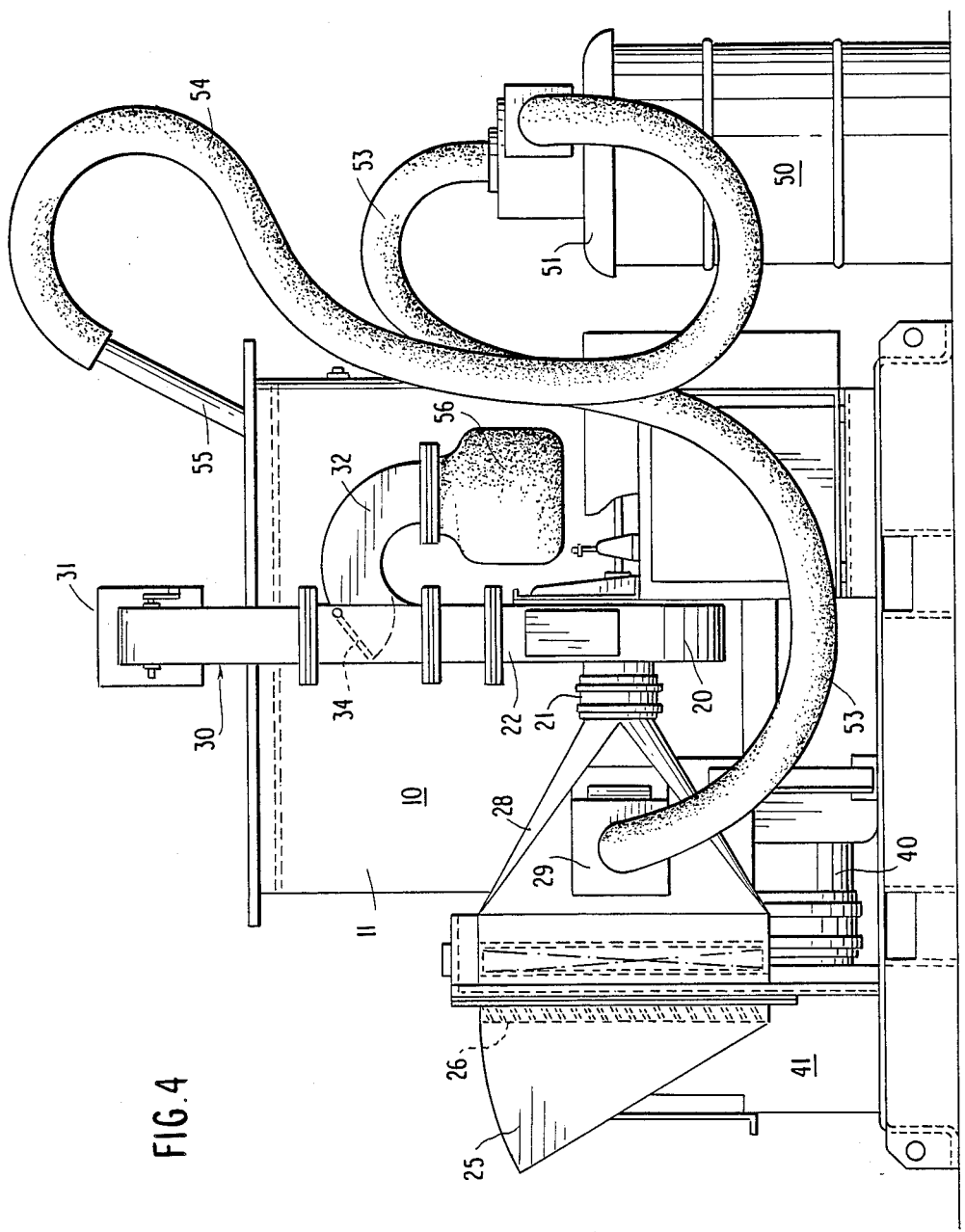
FIG. 4 is a side elevation of a vapor adsorber unit in maintenance disassembly with the contact vessel cover removed and the vacuum recepticle cannister in place.
Figure 5:
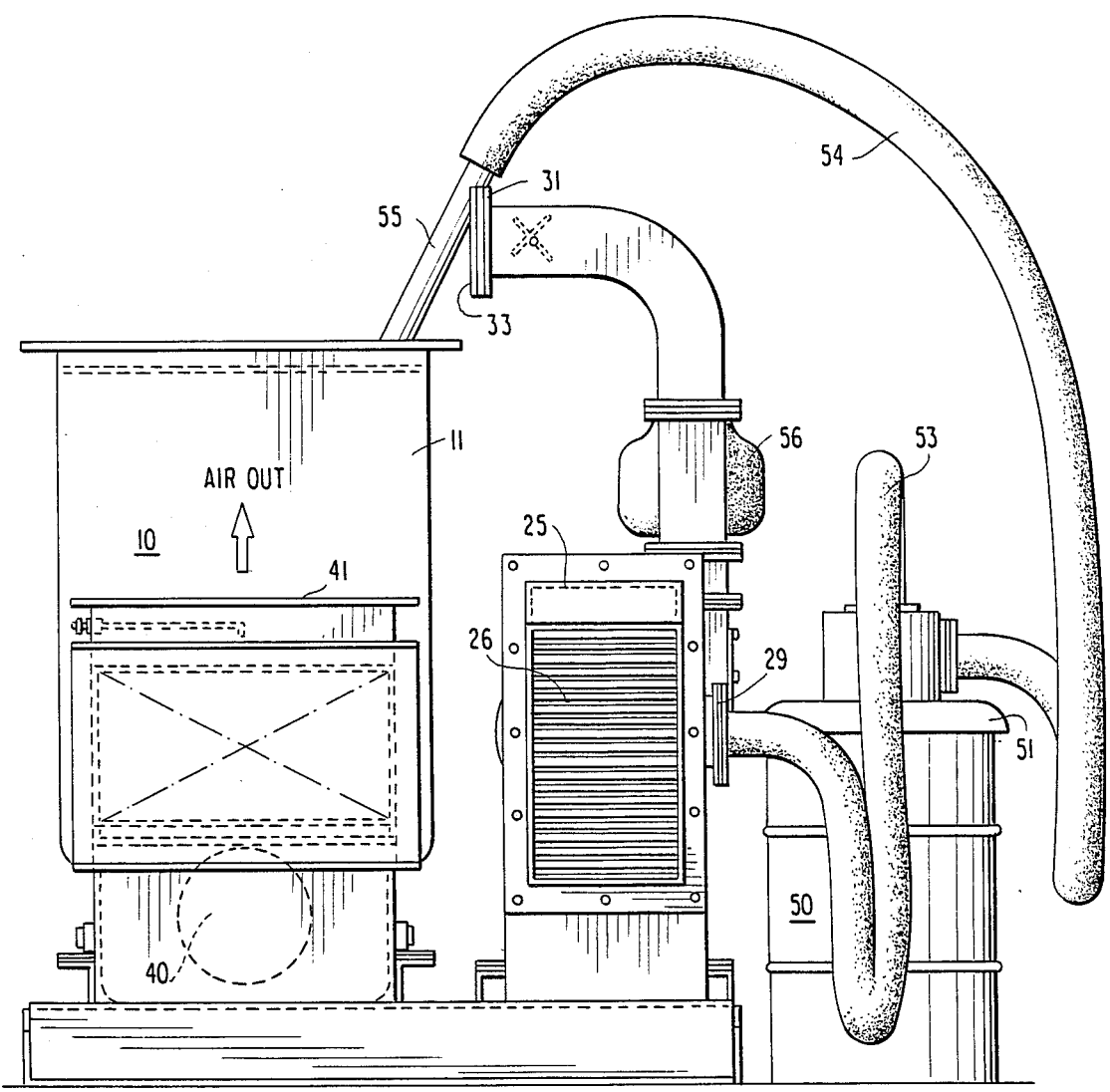
FIG. 5 is an end elevation of the disassembled vapor adsorber unit represented by FIG. 4.
Figure 6:
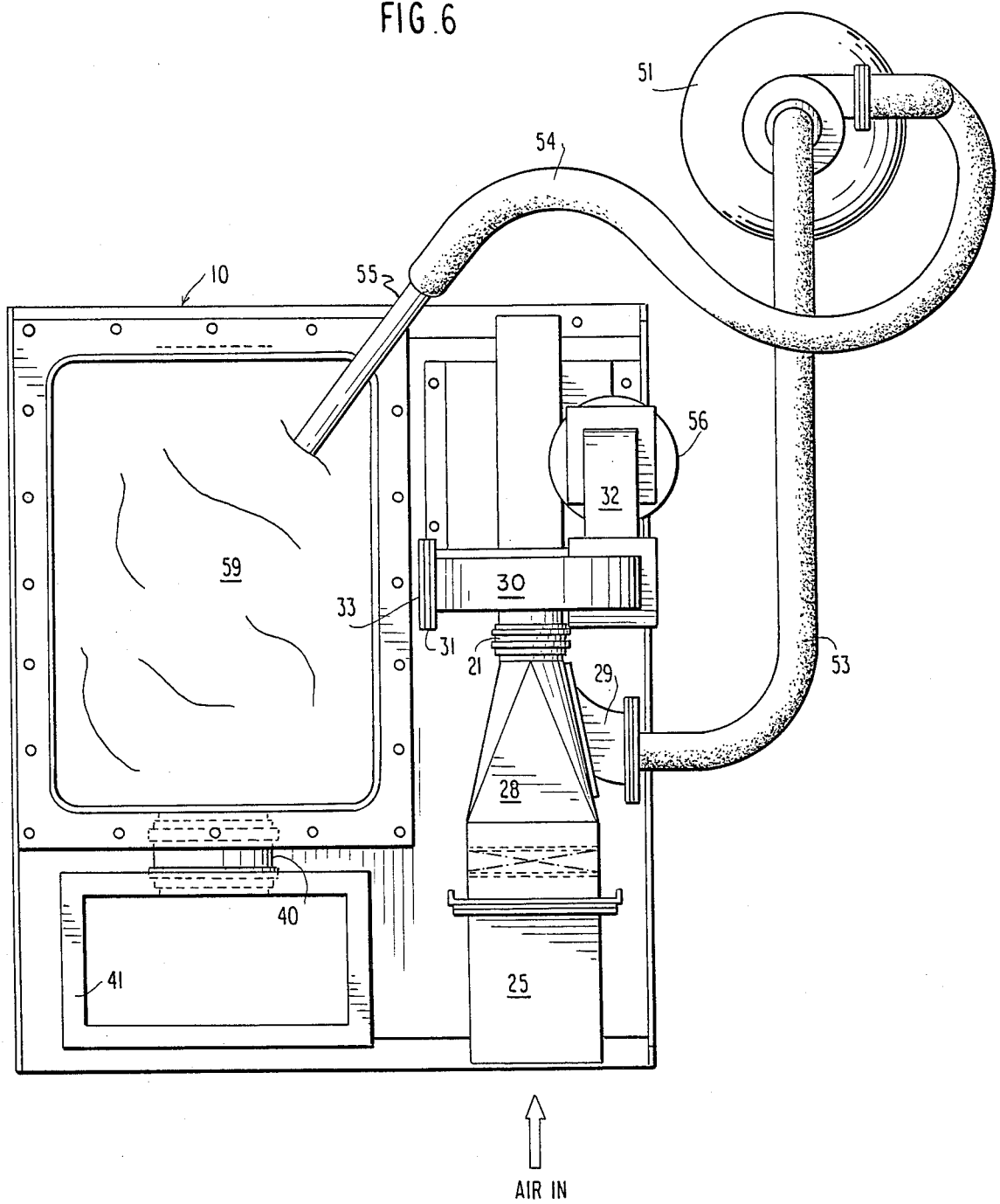
FIG. 6 is a plan view of the disassembled vapor adsorber unit represented by FIG. 4.

FIGS. 4, 5 and 6 illustrate the accessories and connections required to accomplish the same bed removal objective without the use of a vacuum truck.

As a vacuum system receiver, a commonly available, open top 55 gallon steel drum 50 is shown. A hose connection cover 51 seals the receiver top from the open atmosphere. One end of a flexible draft hose 53 is connected to the cover top. The other end of the draft hose 53 is connected to the inlet duct connection piece 29. One end of a suction hose 54 is also connected to the receiver cover 51 and a pickup wand 55 provided on the suction hose other end.

Blind flange 33 is removed from the return −Y connection in the high velocity duct riser and placed over the riser duct joint 31 which has been disconnected from the vessel cover 12. Cover 12 is removed to expose the adsorbent bed 59. In place of the blind flange 33 on the return −Y connection 32, a vacuum filter bag 56 is positioned to capture fines that may be drawn by the draft hose 53 from the receiver 50. Flow directing plate 34 is moved to a position transverse of the normal high velocity duct route.

To complete the transition, it is necessary to block the normal air intake route through the filter 27. For this purpose, an impermeable plate having dimensions identical to the filter is placed in the filter socket in lieu of the filter 27.

In this revised configuration, the fan is started to create a partial vacuum within the receiver 50. Such partial vacuum drives a suction draft at the end of pickup wand 55. When manually manipulated over the spent adsorbent bed 59, the particulate adsorbent is drawn from the vessel bed into the receiver 50. Using a multiplicity of such receivers 50, the total bed volume is divided into individual segments that are each manually manageable.

No attempt has been made to specify dimensions, flow rates and volumetric capacities for the obvious reason that these will depend on the vapor adsorber unit to which the present vacuum system is applied. It is sufficient, however, to note that in specifying dimensions and capacities, careful attention must be paid to the air flow velocity at various points throughout the system. On this point, reference is given to the many sources on vacuum transport design.

Having fully described my invention, I claim:

1. An apparatus for removing spent adsorbent particles from a gas adsorption device having vessel means to contain a particulate adsorption bed, fan means to energize the flow of gas through said adsorption bed, first duct means to confine gas flow into said fan means and second duct means to confine gas flow from said fan means into said vessel means, said apparatus comprising an auxiliary vacuum receiver means, first conduit means connecting said first duct means to said receiver means, second conduit means connecting said receiver means to a manually manipulated vacuum pickup means, first flow blocking means positioned in said first duct means upstream of said first conduit means connection therewith and means to disconnect said second duct means from said vessel means when said vacuum pickup means is used to draft adsorption bed particles from said vessel means into said receiver means.

2. An apparatus as described by claim 1 comprising filter means to receive fan discharge flow through said second duct means when disconnected from said vessel means.

3. A method for removing spent adsorbent particles from a gas adsorption device having vessel means to contain a particulate adsorption bed, fan means to energize the flow of gas through said adsorption bed, first duct means to confine gas flow into said fan means and second duct means to confine gas flow from said fan means into said vessel means, said method comprising the steps of:
   connecting said first duct means to draw gas flow from vacuum receiver means;
   connecting a vacuum pickup wand with said vacuum receiver means for drawing gas therethrough;
   disconnecting said second duct means from said vessel means;
   exposing said adsorption bed to external accessibility; and,
   manipulating said pickup wand within said adsorption bed to draft the particulate constituency of said adsorption bed into said vacuum receiver means.

4. A method as described by claim 3 wherein a normal gas flow opening into said first duct means is closed when said first duct means is connected to said vacuum receiver means.

5. A method as described by claim 3 wherein gas flow from said fan means through said disconnected second duct means is filtered.

6. A method as described by claim 3 wherein said first duct means and said vacuum pickup wand are both connected to closure means for said vacuum receiver means.

* * * * *